Feb. 16, 1954 W. H. NEELY 2,669,290
SINUOUS SPRING ATTACHING MEANS
Filed July 29, 1948 2 Sheets-Sheet 1

INVENTOR.
WILLIAM H. NEELY
BY
Gustav A. Wolff.
ATT

Feb. 16, 1954
W. H. NEELY
2,669,290
SINUOUS SPRING ATTACHING MEANS
Filed July 29, 1948
2 Sheets-Sheet 2
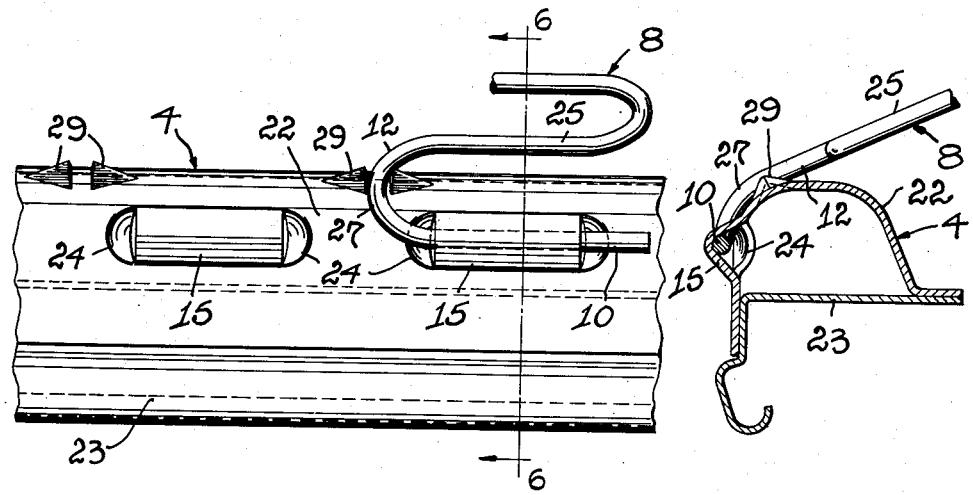
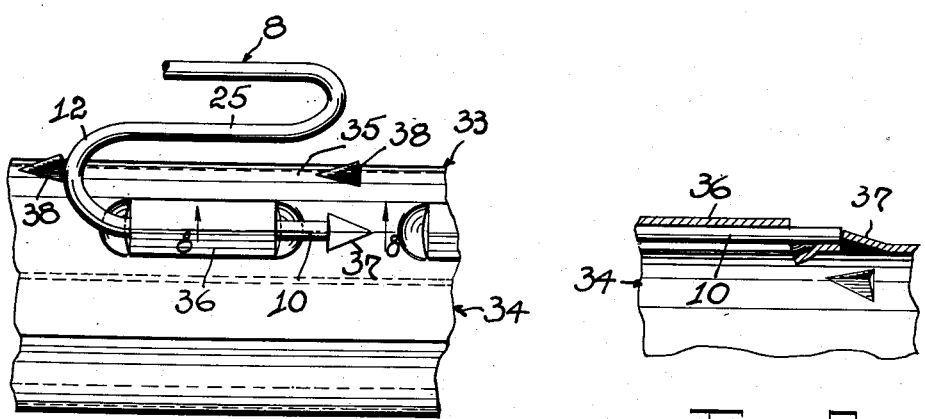
INVENTOR.
WILLIAM H. NEELY
BY
*Gustav A. Wolff*
ATT Patented Feb. 16, 1954

2,669,290

UNITED STATES PATENT OFFICE 2,669,290

SINUOUS SPRING ATTACHING MEANS

William H. Neely, Cleveland, Ohio, assignor to The Universal Wire Spring Company, Cleveland, Ohio, a corporation of Ohio Application July 29, 1948, Serial No. 41,375

4 Claims. (Cl. 155—179)

This invention relates in general to spring constructions and more particularly to spring constructions embodying wire springs of the zigzag or sinuously corrugated type.

The primary object of the invention is the provision of a spring construction of the type referred to above embodying improved means for attaching and supporting the sinuously corrugated wire springs of the spring construction.

Another object of the invention is the provision of a spring construction of the type referred to above embodying improved means for readily and removably attaching and supporting the sinuously corrugated wire springs of the spring construction.

A further object of the invention is the provision of a spring construction of the type referred to above embodying a tubular frame including struck-up portions slidably and pivotally engaged by the end of sinuously corrugated wire springs and struck-up portions engaged with the springs only when properly mounted to prevent their lateral shifting in use.

Still another object of the invention is the provision of a spring construction of the type referred to above embodying a tubular frame with struck-up portions constructed to permit rapid and easy assembling and disassembling of the springs and locking of the assembled springs against lateral movement.

With the above and other incidental objects in view, which will appear hereinafter, the invention consists in certain other novel features of construction and combination of parts, the essential elements of which are set forth in the appended claims; and a preferred form of embodiment of the invention is hereinafter shown with reference to the drawings accompanying and forming part of the specification.

In the drawings:

Fig. 5 is an enlarged fragmentary front view of the front rail of the frame of the seat construction shown in Fig. 1, the front rail being shown while mounting and supporting the front end of a corrugated wire spring.

Fig. 6 is a cross-sectional view on line 6—6 of Fig. 5.

Fig. 7 is an enlarged fragmentary front view of a somewhat modified form of a front rail of a seat construction of the general form shown in Fig. 1, the modified front rail being shown while mounting and supporting the front end of a corrugated wire spring; and Fig. 8 is a longitudinal sectional view on line 8—8 of Fig. 7.

Figure 1:
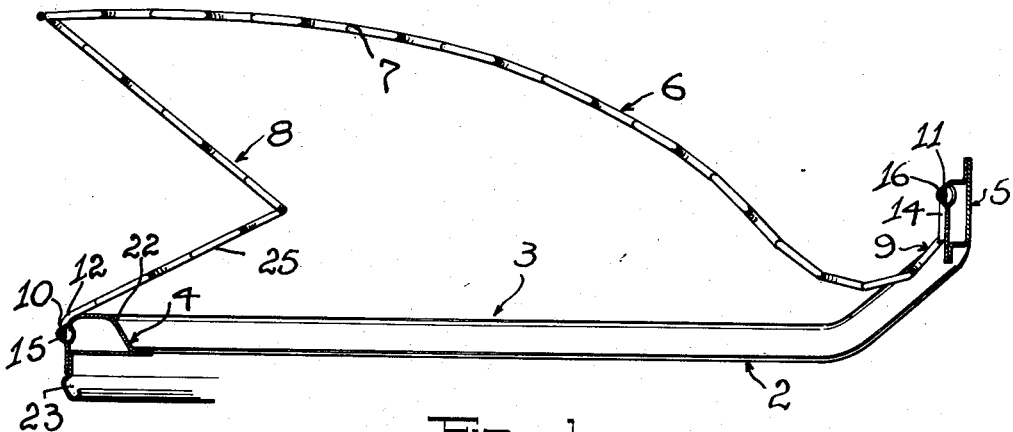
Fig. 1 is a cross-sectional view through a spring seat construction embodying sinuously corrugated wire seat springs, the ends of which are secured to a frame having attaching and supporting means constructed in accordance with the invention.
Figure 2:
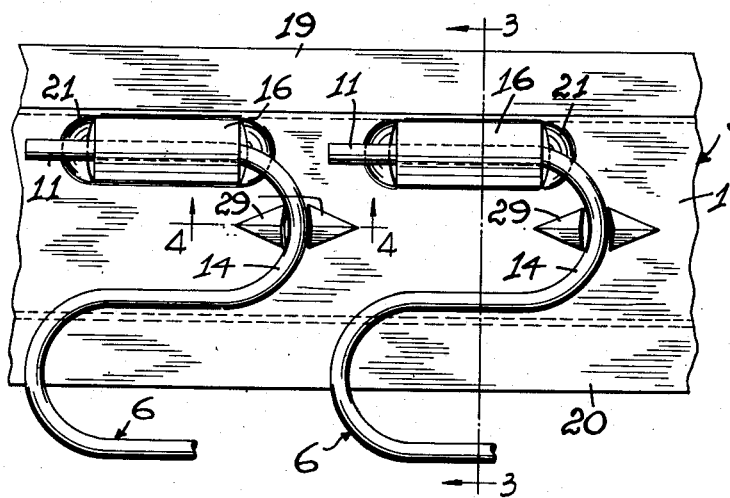
Fig. 2 is an enlarged fragmentary front view of the rear rail of the frame of the seat construction shown in Fig. 1, the rear rail being shown while mounting and supporting the rear ends of several of the corrugated wire springs.
Figure 3:
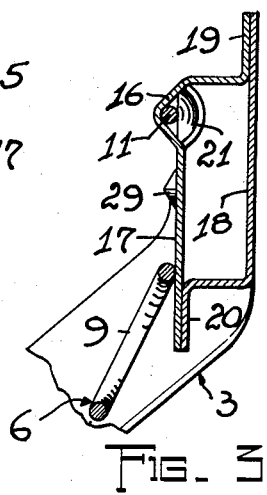
Fig. 3 is a cross-sectional view on line 3—3 of Fig. 2.
Figure 4:
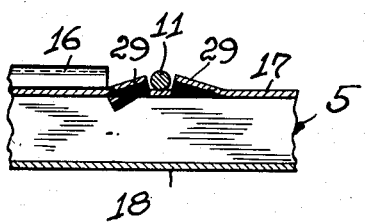
Fig. 4 is a longitudinal sectional view on line 4—4 of Fig. 2.

Referring now in detail to the exemplified form of the invention shown in Figs. 1 through 6, reference numeral 2 indicates a seat structure in which a tubular frame 3 supports on its front and rear rails 4 and 5 a plurality of sinuously corrugated wire springs 6 embodying a resting portion 7, a V-shaped front supporting arm 8 and an upwardly extended rear supporting arm 9. The supporting arms 8 and 9 are removably secured to the tubular front and rear rails 4 and 5 by straight supporting and attachment members 10 and 11 which extend integrally from the end loops 12 and 14 of said supporting arms and are extended through stirrups or trunnions 15 and 16, respectively, on rails 4 and 5. The front and rear rails are assembled from elongated members secured to each other in any suitable way such as welding. Thus rear rail 5 is assembled from two substantially equally shaped, elongated front and rear members 17 and 18, which are secured to each other at their upper and lower portions and formed to a rail having tubular cross section and provided with vertical flanges 19 and 20 extended from diametrically opposed corners of the rail. Front member 17 includes a plurality of aligned stirrups or trunnions 16 formed by shifting such member at spaced areas and forcing the material between the slits outwardly, and in addition member 17 has its wall portions 21 adjacent to the ends of trunnions 16 forced inwardly to facilitate threading of the straight supporting and attachment members 11 of sinuously corrugated wire springs 6 through said trunnions.

The front rail 4 is assembled from two elongated top and bottom members 22 and 23 which are secured to each other to form a rail having tubular cross section. Top member 22 includes a plurality of aligned stirrups or trunnions 15 formed similar to trunnions 16 by slitting member 22 at spaced areas and forcing the material between the slits outwardly, and, in addition member 22 has its wall portions 24 adjacent to the ends of trunnions 15 forced inwardly to facilitate threading of the straight supporting and attachment member 10 of sinuously corrugated wire springs 6 through said trunnions.

To properly seat the springs 6 on the front and rear rails 4 and 5 when the front and rear supporting arms have their attachment members 10 and 11 threaded through the respective stirrups or trunnions 15 and 16, the lower portions 25 of V-shaped front supporting arms 8 have their end loops 12 curved at 27 to hug the front rail 4 and the upwardly extended rear supporting arms 9 are curved so that their end loops 14 contact and seat against the rear rail 5. In addition front and rear rails 4 and 5 include somewhat triangularly shaped struck-up portions 29 formed by slitting the wall of the respective front and top members 17 and 22 of the rails at the respective places, and forcing the material at the slits outwardly. Struck-up portions 29 are arranged in pairs, each pair having its individual struck-up portions positioned opposite to each other and axially spaced from each other a distance substantially equal to the thickness of the wire of springs 6. These pairs are located to engage the opposite sides of the wire of end loops 12 and 14 of the front and rear supporting arms 8 and 9 so as to prevent lateral shifting of the springs when assembled on tubular frame 3.

In the modified form of the invention shown in Figs. 7 and 8, the front rail 33 of tubular frame 34 includes in its top member 35 axially aligned spaced stirrups or trunnions 36 constructed similar to the trunnions 15 and 16 described above to permit proper threading of the straight supporting and attachment members 10 of springs 6 therethrough. In addition top member 35 includes for each trunnion 36 two individual substantially triangularly shaped, struck-up portions 37 and 38. Struck-up portion 37 is arranged in axial alignment with the longitudinal axis of trunnion 36 to stop further movement of supporting and attachment member 10 when threaded through the trunnion, and struck-up portion 38 is positioned to engage the outside of the end loop 12 of the front supporting arm 8 of a spring so as to prevent a lateral movement of the spring when in proper position. The struck-up portions 37 and 38 are similar in construction to the struck-up portions 29 previously described.

Having thus described my invention what I claim is:

1. In a spring structure the combination of sinuously corrugated wire springs formed at their ends with straight attachment members rectangularly related to the axes of said springs, and a frame including oppositely arranged, channeled supporting members formed with axially aligned, upwardly extended trunnions, and pairs of cooperating struck-up portions arranged in the walls of said supporting members and axially offset with respect to said trunnions, said trunnions having the attachment members of said wire springs extended therethrough and each trunnion cooperating with one pair of said struck-up portions arranged to engage opposite sides of a curved wire portion of one of said springs threaded through the trunnion to prevent lateral shifting of such spring when seated on said supporting member and engaged with the trunnion.

2. In a spring structure the combination of sinuously corrugated wire springs formed at their ends with straight attachment members rectangularly related to the axes of said wire springs, and channeled sheet metal supporting members formed with axially aligned upwardly extended trunnions and struck-up portions axially laterally offset with respect to said trunnions, said trunnions formed by outward bulging of the walls of said supporting members between slits in such walls to permit seating of the springs on said supporting member when the attachment members of the wire springs are extended through said trunnions, said struck-up portions being arranged in pairs and each pair having its portions spaced from each other a distance approximately equal to the diameter of the wire of the springs, said pairs of struck-up portions being positioned to hold the curved wire portions of the wire springs against lateral movement when such springs, by their attachment members, are properly mounted on said sheet metal supporting members.

3. A spring structure such as described in claim 2, including recessed portions in the wall of said channeled supporting members arranged adjacent to said trunnions and formed by inward bulging of the walls adjacent to the slits therein.

4. A metal frame member for mounting elongated, sinuously corrugated wire springs formed at their ends with straight attachment portions rectangularly related to the axis of said springs, said frame members including front and rear rails each of which has one wall thereof provided with axially aligned trunnions struck up from the surface thereof and pairs of cooperating struck-up portions in said one wall positioned opposite to each other in axialy and laterally offset relation with respect to said trunnions, said trunnions adapted to seat the attachment portions of said wire springs and said pairs of cooperating struck-up portions positioned to engage with curved wire portions of springs to prevent their lateral shifting when such springs are seated on said front and rear rails and have their attachment portions threaded through the trunnions of said rails.

WILLIAM H. NEELY.

References Cited in the file of this patent

UNITED STATES PATENTS

| Number | Name | Date |
|---|---|---|
| 2,175,062 | Menge | Oct. 3, 1939 |
| 2,241,909 | Hoven et al. | May 13, 1941 |
| 2,244,469 | Menge | June 3, 1941 |
| 2,249,031 | Neely | July 15, 1941 |
| 2,257,633 | Bank | Sept. 30, 1941 |
| 2,260,190 | Neely | Oct. 21, 1941 |
| 2,293,566 | Shanahan | Aug. 18, 1942 |

FOREIGN PATENTS

| Number | Country | Date |
|---|---|---|
| 150,866 | Switzerland | Feb. 1, 1932 |
| 439,698 | Great Britain | Dec. 12, 1935 |